United States Patent Office 3,070,614
Patented Dec. 25, 1962

3,070,614
16-METHYL-PREGNANE
Pietro De Ruggieri, Milan, Italy, assignor to Ormono-
terapia Richter S.p.A., Milan, Italy, a corporation of
Italy
No Drawing. Filed Mar. 7, 1961, Ser. No. 93,879
Claims priority, application Italy Apr. 22, 1960
2 Claims. (Cl. 260—397.4)

An object of this invention is to provide a method for preparing compounds, which are useful intermediates in the synthesis of cortical hormones, represented by the following formula:

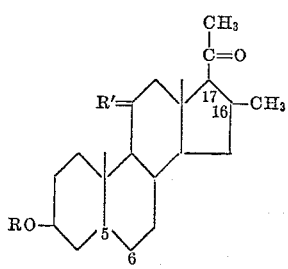

wherein R is hydrogen or the acetyl radical, R' is hydrogen or oxygen, the bond between carbon atoms 5 and 6 is either a single or a double bond and, if single, the hydrogen in angular position 5 has α configuration, and the bond between carbon atoms 16 and 17 is either a single or a double bond As the starting material compounds represented by the following formula have been selected:

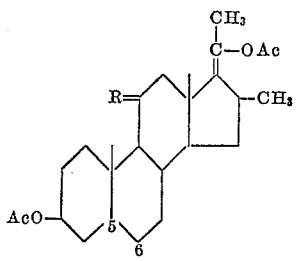

wherein R is hydrogen or oxygen and the bond between carbon atoms 5 and 6 is either a single or a double bond and, if single, the hydrogen in angular position 5 has α configuration.

These compounds (Héusler et al.: Helv. Chim. Acta, 42, 2043, 1959) when treated with bromine in presence of calcium oxide, give the 17α-bromo-derivatives in very good yield and free of contamination by poly-bromo compounds, which instead are obtained by traditional methods. By dehydrobrominating the 17α-bromo-derivatives in dimethylformamide with lithium bromide and lithium carbonate there are obtained the 16-methyl-pregn-16-enes, which by hydrogenation with palladium over barium sulfate as catalyst are transformed into 16β-methyl-derivatives.

The following examples are given to further illustrate the products and process of the present invention and are not to be construed as limiting.

*Example 1.—16α-Methyl-17α-Bromo-Pregn-5-Ene-3β-Ol-20-One-3-Acetate*

A solution of 10.0 parts of 16α-methyl-3β,20-diacetoxy-pregn-5,17-(20)-diene in 200 parts of carbon tetrachloride was stirred at 5° C. with 2 parts of finely powdered calcium oxide and a solution of 7.8 parts of bromine in 40 parts of carbon tetrachloride was added dropwise for 5 minutes. After 10 minutes at 5° C. the mixture was filtered of calcium oxide and poured into a solution of 4.0 parts of sodium metabisulfite in 240 parts of water.

The organic layer was separated, washed with water and evaporated to dryness at reduced pressure.

This residue was dissolved in 400 parts of acetone, 40 parts of dry sodium iodide were added and the mixture was stirred at room temperature for one hour. The mixture was then diluted with 1600 parts of water and the product was filtered, washed with sodium hyposulfite 10% solution, water and dried in vacuum. Crystallization from methanol yielded 10.2–10.5 parts of 16α-methyl-17-α-bromo-pregn-5-one-3β-ol-20-one-3-acetate M.P. 172–176° C.

*Example 2.—16-Methyl-Pregna-5,16-Diene-3β-Ol-20-One-3-Acetate*

A solution of 10 parts of 16α-methyl-17α-bromo-pregn-5-ene-3β-ol-20-one-3-acetate in 200 parts of dry dimethyl formamide was heated for 3 hours at 100° C. in a nitrogen atmosphere, with 10.5 parts of dry lithium bromide and 9.2 parts of dry lithium carbonate.

The lithium salts were filtered off and the solution diluted with 500 parts of water; the completely precipitated product was filtered, washed with water and dried in vacuum at 40–50° C. A crystallization from methanol yielded 7.2–7.4 parts of 16-methyl-pregna-5,16-diene-3β-ol-20-one-3-acetate M.P. 170–172° C.; $[\alpha]_D = 93°$ (chf.);

$\lambda_{max.}^{EtOH}$ at 252 mμ, log $\epsilon = 4.0$

*Example 3.—16-Methyl-Pregna-5,16-Diene-3β-Ol-20-One*

0.5 part of 16-methyl-pregna-5,16-diene-3β-ol-20-one-3-acetate were refluxed for 1 hour with a solution of 0.625 part of potassium hydroxide in 25 parts of methanol; after dilution with water and filtration, the product was crystallized from acetone-hexane: M.P. 192–193° C.; $[\alpha]_D = -105°$ (chf.);

$\lambda_{max.}^{EtOH}$ at 250 mμ, log $\epsilon = 4.28$

*Example 4.—16β-Methyl-Pregn-5-Ene-3β-Ol-20-One-3-Acetate*

A solution of 7.0 parts of 16-methyl-pregna-5,16-diene-3β-ol-20-one-3-acetate in 300 parts of ethyl acetate was shaken in hydrogen with 14 parts of a catalyst comprising 5% palladium adsorbed on barium sulfate until the absorption of gas had ceased, i.e. when the 16,17 double bond is saturated. After separation from the catalyst by filtration, the solvent was removed at reduced pressure and the residue was crystallized from methanol to yield 5.8 parts of 16β-methyl-pregn-5-ene-3β-ol-20-one-3-acetate M.P. 154–156° C.; $[\alpha]_D = -24°$ (chf.).

*Example 5.—16β-Methyl-Pregn-5-Ene-3β-Ol-20-One*

A solution of 3 parts of 16-methyl-pregna-5,16-diene-3β-ol-20-one in 150 parts of ethyl acetate was shaken in a hydrogen atmosphere with 6 parts of a catalyst comprising 5% palladium absorbed on barium sulfate until no gas was further adsorbed, that is until saturation of 16,17-double bond. After separation of the catalyst by filtration, the solvent was driven off at reduced pressure and the residue was crystallized from methanol, yielding 2.6 parts of 16β-methyl-pregn-5-ene-3β-ol-20-one, M.P. 198–200° C.; $[\alpha]_D = -13°$ (diox.).

Example 6.—16α-Methyl-17α-Bromo-5α-Pregnane-3β-Ol-20-One-3-Acetate

A solution of 5.0 parts of 16α-methyl-3β,20-diacetoxy-5α-pregn-17(20)-ene in 100 parts of carbon tetrachloride was stirred at 5° C. with 1.0 part of finely powdered calcium oxide and a solution of 1.9 parts of bromine in 10 parts of carbon tetrachloride was added dropwise for 5 minutes.

After 10 minutes at 5° C. the mixture was filtered of the calcium oxide and poured into a solution of 1.0 part of sodium metabisulfite in 60 parts of water.

The organic layer was separated, washed with water and evaporated to dryness at reduced pressure; the residue was crystallized from methanol-acetone to give 5.2–5.5 parts of 16α-methyl-17α-bromo-pregnane-3β-ol-20-one-3-acetate, M.P. 138–142° C.

Example 7.—16-Methyl-5α-Pregn-16-Ene-3β-Ol-20-One-3-Acetate

A solution of 5.0 parts of 16α-methyl-17α-bromo-5α-pregnane-3β-ol-20-one-3-acetate in 100 parts of dry dimethylformamide was heated for 3 hours at 100° C. in a nitrogen atmosphere with 5.3 parts of dry lithium bromide and 4.6 parts of dry lithium carbonate. The lithium salts were filtered off and the solution diluted with 250 parts of water; the completely precipitated product was filteerd, washed with water and dried in vacuum. Crystallization from methanol yielded 3.8–4.0 parts of 16-methyl-5α-pregn-16-ene-3β-ol-20-one-3-acetate, M.P. 167–169° C.; $[\alpha]_D = -23°$ (chf.);

$\lambda_{max.}^{EtOH}$ at 252 mµ, log $\epsilon = 4.0$

Example 8.—16β-Methyl-5α-Pregnane-3β-Ol-20-One-3-Acetate

A solution of 3.5 parts of 16-methyl-5α-pregn-16-ene-3β-ol-20-one-3-acetate in 150 parts of ethyl acetate was shaken in hydrogen with 7.0 parts of a catalyst comprising 5% palladium adsorbed on barium sulfate catalyst until uptake of gas had ceased. After separation of catalyst through filtration, the solvent was removed at reduced pressure and the residue was crystallized from methanol to yield 3.0 parts of 16β-methyl-5α-pregnane-3β-ol-20-one-3-acetate, M.P. 147–148° C.; $[\alpha]_D = +30°$ (chf.).

Example 9.—16α-Methyl-17α-Bromo-5α-Pregnane-3β-Ol-11,20-Dione-3-Acetate

A solution of 10.0 parts of 16α-methyl-3β,20-diacetoxy-5α-pregn-17-(20)-ene-11-one in 190 parts of carbon tetrachloride was stirred at 5° C. with 2.4 parts of finely powdered calcium oxide and over a period of 5 minutes a solution of 3.5 parts of bromine in 27 parts of carbon tetrachloride was added dropwise. After 10 minutes at 5% C. the mixture was filtered from calcium oxide and poured in a solution of 2.0 parts of sodium metabisulfite in 120 parts of water.

The organic layer was separated, washed with water and evaporated to dryness at reduced pressure; the residue was crystallized from aqueous acetone yielding 10.2–10.5 parts of 16α-methyl-17α-bromo-5α-pregnane-3β-ol-11,20-dione-3-acetate, M.P. 169–171° C.

Example 10.—16-Methyl-5α-Pregn-16-Ene-3β-Ol-11,20-Dione-3-Acetate

A solution of 10.0 parts of 16α-methyl-17α-bromo-5α-pregnane-3β-ol-11,20-dione-3-acetate in 170 parts of dry dimethylformamide was heated for 3 hours at 100° C. in a nitrogen atmosphere with 10.3 parts of anhydrous lithium bromide and 8.8 parts of anhydrous lithium carbonate. The lithium salts were filtered and the solution diluted with 650 parts of water. The completely precipitated product was filtered, washed with water and dried in vacuum at 40–50° C. Upon crystallization from methanol there was obtained 6.8–7.0 parts of 16-methyl-5α-pregn-16-ene-3β-ol-11,20-dione-3-acetate, M.P. 165–167° C.; $[\alpha]_D = +24.3°$ (chf.);

$\lambda_{max.}^{EtOH}$ at 248 mµ; log $\epsilon = 4.0$

Example 11.—16-Methyl-5α-Pregn-16-Ene-3β-Ol-11,20-Dione 1.5 parts of 16-methyl-5α-pregn-16-ene-3β-ol-11,20-dione-3-acetate were refluxed for 1 hour with a solution of 1.75 parts of potassium hydroxide in 70 parts of methanol. After dilution with water and filtration, the product was crystallized from acetone to yield 1.2 parts of 16-methyl-5α-pregn-16-ene-3β-ol-11,20-dione, M.P. 223–224° C.; $[\alpha]_D = +43°$ (chf.);

$\lambda_{max.}^{EtOH}$ at 248 mµ; log $\epsilon = 4.1$

Example 12.—16β-Methyl-5α-Pregnane-3β-Ol-11,20-Dione-3-Acetate

A solution of 3.5 parts of 16-methyl-5α-pregn-16-ene-3β-ol-11,20-dione-3-acetate in 150 parts of ethyl acetate was shaken in a hydrogen atmosphere with 7.0 parts of a catalyst comprising 5% palladium adsorbed on barium sulfate until no more gas was absorbed. After separation of the catalyst by filtration, the solvent was driven off at reduced pressure and the residue was crystallized from methanol, yielding 3.1 parts of 16β-methyl-5α-pregnane-3β-ol-11,20-dione-3-acetate, M.P. 155–157° C.; $[\alpha]_D = +53°$ (chf.).

Example 13.—16β-Methyl-5α-Pregnane-3β-Ol-11,20-Dione

A solution of 1.2 parts of 16-methyl-5α-pregn-16-ene-3β-ol-11,20-dione in 120 parts of ethyl acetate was shaken in a hydrogen atmosphere with 2.4 parts of a catalyst comprising 5% palladium adsorbed on barium sulfate until no more gas was adsorbed. After separation of the catalyst by filtration, the solvent was removed at reduced pressure, and the residue was crystallized from acetone-ethyl ether, yielding 1.1 parts of 16β-methyl-5α-pregnane-3β-ol-11,20-dione, M.P. 220–222° C.; $[\alpha]_D = +70°$ (chf.).

The present application is a continuation-in-part of my copending application Serial No. 39,433, filed June 29, 1960, and now abandoned.

I claim:
1. A method for the preparation of compounds of the formula

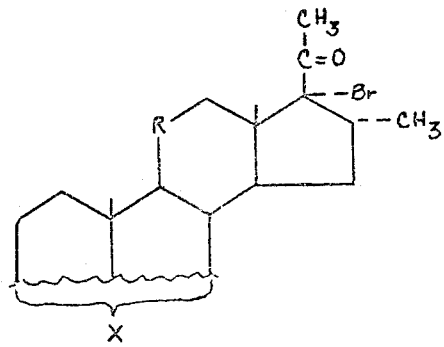

(I)

wherein R is selected from the group consisting of

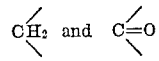

and X is selected from the group consisting of

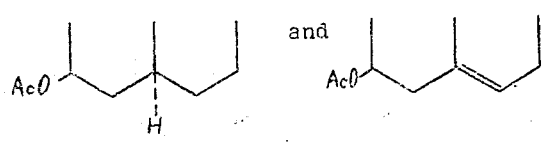

comprising the reaction of compounds of the formula

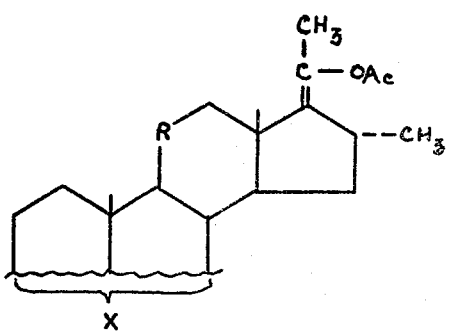

(II)

wherein R and X are the same as in Formula I, with bromine in the presence of calcium oxide.

2. A process as claimed in claim 1 comprising the additional step of reacting said compounds of Formula I with lithium bromide and lithium carbonate in dimethylformamide to form compounds of the formula

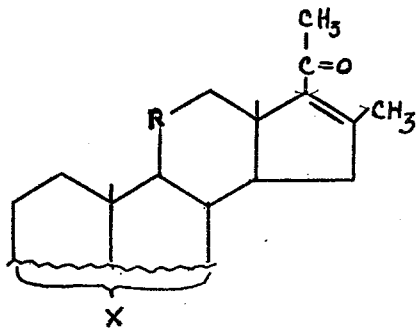

wherein R is selected from the group consisting of

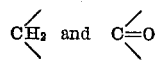

and X is selected from the group consisting of

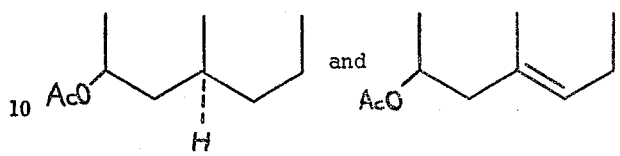

References Cited in the file of this patent
UNITED STATES PATENTS

| | | |
|---|---|---|
| 2,684,963 | Schock et al. | July 27, 1954 |
| 2,923,721 | Joly et al. | Feb. 2, 1960 |
| 2,944,070 | Kollonitsch et al. | July 5, 1960 |
| 2,983,736 | Georgian et al. | May 9, 1961 |
| 2,989,553 | Modderman et al. | June 20, 1961 |
| 3,013,034 | Sletzinger et al. | Dec. 12, 1961 |

FOREIGN PATENTS

| | | |
|---|---|---|
| 744,237 | Great Britain | Feb. 1, 1956 |

OTHER REFERENCES

Taub et al.: J. A. C. S. 80, 4435 (1958).
Loewenthal Tetrahedron 6, 269–303 (1959).
Taub et al.: J. A. C. S. 82, 4012–4026 (1960).